US008734023B2

(12) United States Patent
Ashmore

(10) Patent No.: US 8,734,023 B2
(45) Date of Patent: May 27, 2014

(54) BEARING RACE

(75) Inventor: Daren R. Ashmore, Nottingham (GB)

(73) Assignee: Rolls-Royce PLC, London (GB)

( * ) Notice: Subject to any disclaimer, the term of this patent is extended or adjusted under 35 U.S.C. 154(b) by 558 days.

(21) Appl. No.: 12/087,381

(22) PCT Filed: Dec. 8, 2006

(86) PCT No.: PCT/GB2006/004584
§ 371 (c)(1),
(2), (4) Date: Jul. 2, 2008

(87) PCT Pub. No.: WO2007/077413
PCT Pub. Date: Jul. 12, 2007

(65) Prior Publication Data
US 2009/0003748 A1    Jan. 1, 2009

(30) Foreign Application Priority Data

Jan. 6, 2006 (GB) .................................. 0600172.1

(51) Int. Cl.
*F16C 33/58* (2006.01)

(52) U.S. Cl.
USPC .......................................... 384/569; 384/513

(58) Field of Classification Search
USPC .................. 384/513, 519, 569, 581, 583, 584
See application file for complete search history.

(56) References Cited

U.S. PATENT DOCUMENTS

| 1,884,395 | A | | 10/1932 | Tyson |
| 2,947,581 | A | | 8/1960 | Van Dorn et al. |
| 3,009,748 | A | * | 11/1961 | Pitner ........................... 384/581 |
| 3,512,856 | A | | 5/1970 | Robinson |
| 3,628,836 | A | * | 12/1971 | Mulready et al. ............. 384/581 |
| 3,907,387 | A | | 9/1975 | Spieth |
| 4,451,110 | A | * | 5/1984 | Forestier et al. .............. 384/582 |
| 5,020,925 | A | * | 6/1991 | Stephan et al. ................ 384/569 |
| 5,567,060 | A | * | 10/1996 | Steinberger et al. .......... 384/569 |
| 6,062,736 | A | * | 5/2000 | Zernickel ....................... 384/581 |
| 6,413,046 | B1 | * | 7/2002 | Penn et al. ......................... 416/1 |
| 6,439,772 | B1 | * | 8/2002 | Ommundson et al. .......... 384/99 |
| 6,682,219 | B2 | * | 1/2004 | Alam et al. ...................... 384/99 |
| 2005/0100258 | A1 | * | 5/2005 | Brossier et al. ............... 384/477 |
| 2009/0185769 | A1 | * | 7/2009 | Morton et al. ................. 384/563 |

FOREIGN PATENT DOCUMENTS

| DE | 11 58 325 B | 11/1963 |
| DE | 40 35 811 A1 | 5/1992 |
| DE | 94 15 059 U1 | 12/1994 |
| DE | 20 2004 013 192 U1 | 12/2004 |
| FR | 2 365 112 A1 | 4/1978 |
| GB | 2 282 421 A | 4/1995 |
| JP | A-2000-087977 | 3/2000 |
| JP | A-2002-275580 | 9/2002 |

* cited by examiner

*Primary Examiner* — Marcus Charles
*Assistant Examiner* — Adam D Rogers
(74) *Attorney, Agent, or Firm* — Oliff PLC

(57) ABSTRACT

A race for a rolling-element bearing is characterized in that the race comprises at least one circumferentially-extending region having a reduced stiffness compared with the remainder of the race. The or each circumferentially-extending region may be thinner than the remainder of the race, and may further comprise a hole or a slot. In a particular preferred embodiment there are two such circumferentially-extending regions, each extending around an arc of approximately 60 degrees in the circumferential direction.

11 Claims, 2 Drawing Sheets

BEARING RACE

Figure 1:
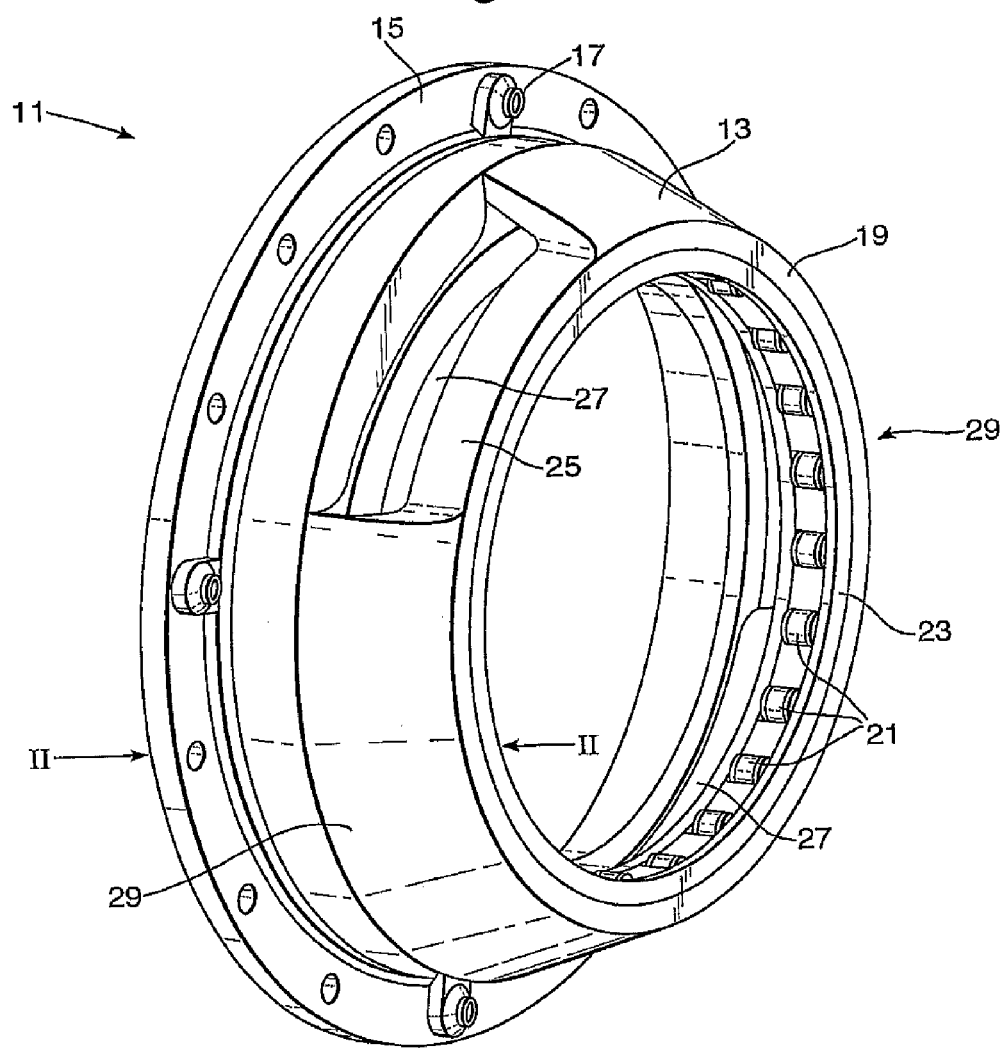

This invention relates to rolling-element bearings, and particularly to the design of outer races for such bearings.

BACKGROUND

A known problem with rolling-element bearings (especially those that operate at high speeds but at low loads) is skidding. The rolling element, instead of rolling on the inner track of the bearing, slides along it. This causes the rolling element to heat up at the contact point. If the sliding element breaks through the lubricant film, damage may be caused to the rolling elements or to the tracks. This phenomenon is known as skidding.

A known way to reduce skidding in lightly-loaded bearings is deliberately to make the outer race non-circular so that an interference exists across the bearing at two or more points. In use, the outer race will then bend due to this interference until a force equilibrium is reached, and a resultant load will be present at two or more positions across the bearing. The magnitude of the force can be controlled (by suitable choice of the magnitude of the non-circularity) to prevent the bearing from skidding.

A disadvantage with such bearings is that they require a squeeze film housing, or some other type of housing with enough clearance to allow the outer race to bend. If it is not possible to incorporate such a housing (for example, because of space or weight restrictions or oil feed issues) then it will be necessary to use a clear housing or a flanged outer race. In high speed applications a clear housing may be prone to fretting and so a flanged outer race is preferable. Another reason that a flanged outer race may be preferred is that such a race allows tighter control of the alignment of the shaft carried by the bearing.

A problem is that a flanged outer race is usually much stiffer than other types of outer race. The solution to the problem of skidding set out above, using a non-circular outer race, relies on the flexibility of the outer race and consequently it is unsatisfactory to use a flanged outer race in this situation.

SUMMARY

This invention presents an alternative solution to the problem of skidding in lightly-loaded bearings, which is suitable for high-speed bearings requiring flanged outer races. It may also be applied to other configurations of rolling-element bearing.

According to the invention, a race for a rolling-element bearing is characterised in that the race comprises at least one circumferentially-extending region having a reduced stiffness compared with the remainder of the race.

The or each circumferentially-extending region may be thinner than the remainder of the race, and may further comprise a hole or a slot.

Preferably, there are two such circumferentially-extending regions, each extending around an arc of approximately 60 degrees in the circumferential direction.

The race may be an outer race, and may be flanged.

The race may be a part of a rolling-element bearing. The rolling elements in such a bearing may be rollers.

An embodiment of the invention will now be described, by way of illustration, with reference to the accompanying drawings in which

DRAWINGS

Figure 2:
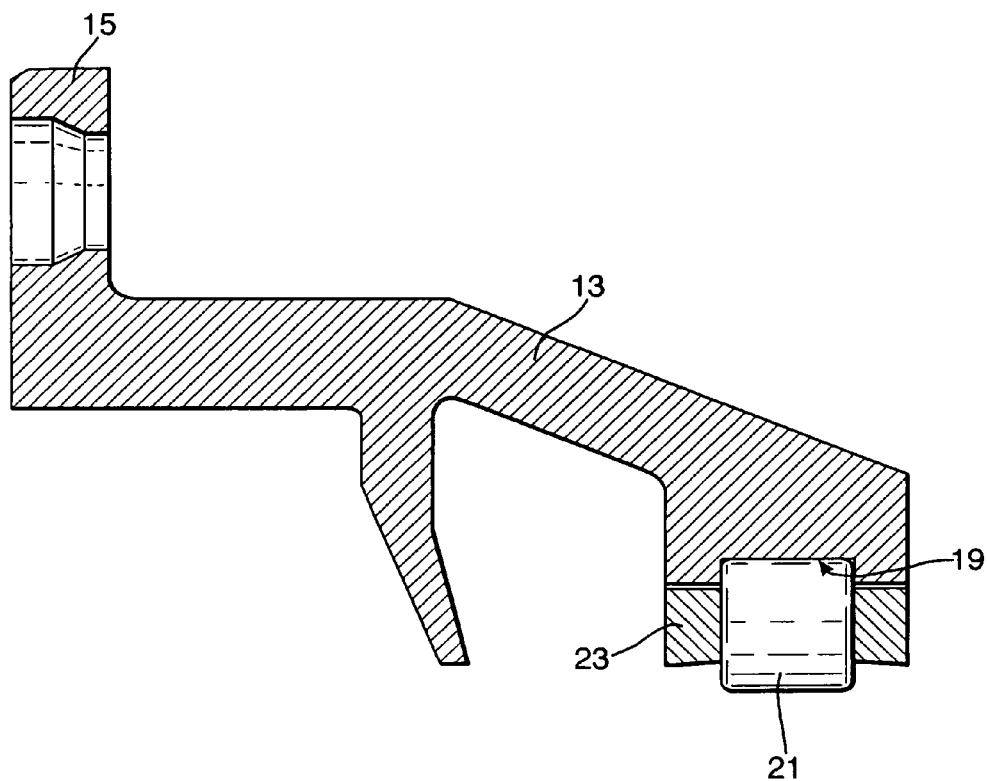

FIG. 1 is a perspective view of a race for a rolling-element bearing according to the invention; and FIG. 2 is a sectional view of the race of FIG. 1, on the line II-II.

DETAILED DESCRIPTION

Referring to FIG. 1, a bearing race for a rolling-element bearing of a gas turbine engine is shown generally at 11. The outer race 13 has a flange 15, and a plurality of bolts 17 (not all are shown) secure the outer race to other structure (not shown) of the engine. The bearing race includes a first end having a first outer circumference and a second end having a second outer circumference, where the second outer circumference is smaller than the first outer circumference.

On the radially inner face of the outer race 13 is a circumferentially-extending track 19, on which run a plurality of rollers 21, held in a cage 23. Radially inwards of the cage is an inner race (not shown). FIG. 2, a cross-section of FIG. 1 on the line II-II, shows the relationship of these features more clearly.

At two points around the circumference of the outer race 13, thinned regions 25 and cut-outs 27 are provided. Each of these features 25, 27 extends around approximately 60 degrees of the circumference. Their effect is to reduce the stiffness of the outer race 13 at these places on the circumference, compared with the thinned regions 29. This localised reduction in stiffness causes the outer race to deform into a non-circular shape in use, with the majority of the deformation coincident with the thinned regions 25 and cut-outs 27, and an insignificant deformation at the positions 29. This deformation causes an interference with the rollers 21 at the positions of the features 25, 27, and the consequent force on the rollers 21 prevents any sliding which may lead to skidding. Despite this, however, the rigidity and dimensional accuracy of the outer race 13 in the region of the flange 15 is unaffected, because the deformation is substantially limited to the thinned and cut-out regions 25, 27. The cut-outs 27 represent holes or slots that extend through an entire thickness of the race, and which correspond to a means for deforming the race.

It will be appreciated that certain modifications may be made to the embodiment described here, without departing from the concept of the invention. For example, the thinned regions and cut-outs may each occupy less or more than the 60 degrees of the embodiment described. More than two such regions may be provided. By such modifications, the stiffness variation around the circumference of the race may be tailored for a particular application.

Although it is particularly suited for applications in which a high-speed, lightly loaded roller bearing needs to be provided with a flanged outer race, it could advantageously be applied to other types of bearings, or to bearings operating under different speed or load conditions.

The invention claimed is:
1. A race for a rolling-element bearing, the bearing having a plurality of rolling elements, the race having an axial direction, a circumference extending around the axial direction, and a thickness in a radial direction, the race comprising:
   at least one circumferentially-extending region having a stiffness less than a stiffness of the remainder of the race, wherein
   a path of the plurality of rolling elements is arranged on a circumferentially extending track;
   the at least one circumferentially-extending region includes a thinned region, and a hole or a slot extending through the entire thickness of the race;

the hole or slot is axially connected to the thinned region within the at least one circumferentially-extending region;

the thinned region is radially disposed above the circumferentially-extending track; and the hole or slot is axially displaced from and parallel to the path of the plurality of rolling elements.

2. The race of claim 1, wherein the thinned region is thinner than the remainder of the race.

3. The race of claim 1, wherein the at least one circumferentially-extending region includes two circumferentially extending regions.

4. The race of claim 3, wherein each region extends around an arc of approximately 60 degrees in a circumferential direction.

5. The race of claim 1, wherein the race is an outer race.

6. The race of claim 1, wherein the race is flanged.

7. A rolling-element bearing including a race as in claim 1.

8. A rolling-element bearing including a race as in claim 1, wherein the rolling-element bearing is a roller bearing.

9. The race of claim 1, wherein the at least one circumferentially-extending region is longer in a circumferential direction than in the axial direction.

10. The race of claim 1, wherein a stiffness of part of the at least one circumferentially-extending region in one axial plane is less than the stiffness of a remainder of the at least one circumferentially-extending region in the one axial plane.

11. The race of claim 1, wherein in use, the race deforms into a non-circular shape, so as to cause an interference with the plurality of rolling elements at a circumferential portion of the at least one circumferentially-extending region.

* * * * *